United States Patent
Kobayashi

(10) Patent No.: US 7,800,623 B2
(45) Date of Patent: Sep. 21, 2010

(54) BYPASSING PIXEL CLOCK GENERATION AND CRTC CIRCUITS IN A GRAPHICS CONTROLLER CHIP

(75) Inventor: Osamu Kobayashi, Los Altos, CA (US)

(73) Assignee: Genesis Microchip Inc., Santa Clara, CA (US)

( * ) Notice: Subject to any disclaimer, the term of this patent is extended or adjusted under 35 U.S.C. 154(b) by 835 days.

(21) Appl. No.: 10/909,027

(22) Filed: Jul. 29, 2004

(65) Prior Publication Data

US 2005/0062699 A1    Mar. 24, 2005

Related U.S. Application Data

(60) Provisional application No. 60/504,060, filed on Sep. 18, 2003, provisional application No. 60/562,737, filed on Apr. 15, 2004.

(51) Int. Cl.
*G09G 5/36* (2006.01)
*G09G 5/39* (2006.01)

(52) U.S. Cl. .................. 345/560; 345/547; 345/531

(58) Field of Classification Search ............... 345/87, 345/1.1, 531, 530, 3.1, 534, 501, 560, 547
See application file for complete search history.

(56) References Cited

U.S. PATENT DOCUMENTS

| | | | |
|---|---|---|---|
| 4,479,142 A | 10/1984 | Buschman et al. | |
| 4,796,203 A | 1/1989 | Roberts | |
| 4,868,557 A * | 9/1989 | Perlman | ...................... 345/538 |
| 5,245,612 A | 9/1993 | Kachi et al. | |
| 5,258,983 A | 11/1993 | Lane et al. | |
| 5,369,775 A | 11/1994 | Yamasaki et al. | |
| 5,425,101 A | 6/1995 | Woo et al. | |
| 5,515,296 A | 5/1996 | Agarwal | |
| 5,541,919 A | 7/1996 | Yong et al. | |
| 5,608,418 A * | 3/1997 | McNally | ...................... 345/3.1 |
| 5,615,376 A * | 3/1997 | Ranganathan | ............... 713/322 |
| 5,625,379 A | 4/1997 | Reinert et al. | |
| 5,629,715 A * | 5/1997 | Zenda | ......................... 345/3.1 |
| 5,670,973 A * | 9/1997 | Bassetti et al. | ................. 345/58 |

(Continued)

FOREIGN PATENT DOCUMENTS

CN    1353513    6/2002

(Continued)

OTHER PUBLICATIONS

"CLUT", http://en.wikipedia.org/wiki/CLUT.*

(Continued)

*Primary Examiner*—Joni Hsu
(74) *Attorney, Agent, or Firm*—Lisa K. Jorgenson; Beyer Law Group LLP

(57) ABSTRACT

In a video processor unit, a method of providing a video data stream at a clock rate that is independent of a pixel clock rate. Receiving native video data from a video source at a native clock rate, storing the video data in a memory unit, reading selected portions of the video data at a memory clock rate, rasterizing the selected video data, packetizing the rasterized video data, sending the packetized video data to a display unit by way of a link at a link rate, wherein the link rate is directly related to the memory clock rate.

12 Claims, 5 Drawing Sheets

U.S. PATENT DOCUMENTS

| | | | |
|---|---|---|---|
| 5,739,803 A | 4/1998 | Neugebauer | |
| 5,745,837 A | 4/1998 | Fuhrmann | |
| 5,786,844 A | 7/1998 | Rogers et al. | |
| 5,790,083 A * | 8/1998 | Bassetti | 345/3.1 |
| 5,801,776 A * | 9/1998 | Tamura et al. | 375/240.18 |
| 5,805,173 A * | 9/1998 | Glennon et al. | 345/501 |
| 5,838,875 A | 11/1998 | Cho et al. | |
| 5,852,630 A | 12/1998 | Langberg et al. | |
| 5,909,465 A | 6/1999 | Bottomley et al. | |
| 5,918,002 A | 6/1999 | Klemets et al. | |
| 5,926,155 A | 7/1999 | Arai et al. | |
| 5,940,137 A | 8/1999 | Hulvey | |
| 5,949,437 A | 9/1999 | Clark | |
| 6,005,861 A | 12/1999 | Humpleman | |
| 6,020,901 A | 2/2000 | Lavelle et al. | |
| 6,038,000 A | 3/2000 | Hurst, Jr. | |
| 6,049,316 A * | 4/2000 | Nolan et al. | 345/698 |
| 6,049,769 A | 4/2000 | Holmes et al. | |
| 6,069,929 A | 5/2000 | Yabe et al. | |
| 6,151,334 A | 11/2000 | Kim et al. | |
| 6,151,632 A | 11/2000 | Chadda et al. | |
| 6,154,225 A | 11/2000 | Kou et al. | |
| 6,175,573 B1 | 1/2001 | Togo et al. | |
| 6,177,922 B1 | 1/2001 | Schiefer et al. | |
| 6,219,736 B1 | 4/2001 | Klingman | |
| 6,223,089 B1 | 4/2001 | Page | |
| 6,249,319 B1 | 6/2001 | Post | |
| 6,326,961 B1 | 12/2001 | Lin et al. | |
| 6,330,605 B1 | 12/2001 | Christensen et al. | |
| 6,337,964 B2 | 1/2002 | Inami et al. | |
| 6,353,594 B1 | 3/2002 | Tooker et al. | |
| 6,356,260 B1 | 3/2002 | Montalbo | |
| 6,437,768 B1 | 8/2002 | Kubota et al. | |
| 6,441,857 B1 | 8/2002 | Wicker et al. | |
| 6,446,130 B1 | 9/2002 | Grapes | |
| 6,477,252 B1 | 11/2002 | Faber et al. | |
| 6,542,967 B1 | 4/2003 | Major | |
| 6,543,053 B1 | 4/2003 | Li et al. | |
| 6,545,688 B1 | 4/2003 | Loveridge et al. | |
| 6,577,303 B2 | 6/2003 | Kim | |
| 6,587,480 B1 | 7/2003 | Higgins et al. | |
| 6,598,161 B1 | 7/2003 | Kluttz et al. | |
| 6,600,469 B1 * | 7/2003 | Nukiyama et al. | 345/87 |
| 6,608,828 B1 | 8/2003 | Balachandran | |
| 6,614,800 B1 | 9/2003 | Genty et al. | |
| 6,661,422 B1 * | 12/2003 | Valmiki et al. | 345/530 |
| 6,697,376 B1 | 2/2004 | Son et al. | |
| 6,704,310 B1 | 3/2004 | Zimmermann et al. | |
| 6,765,931 B1 | 7/2004 | Rabenko et al. | |
| 6,778,168 B2 * | 8/2004 | Mamiya et al. | 345/204 |
| 6,862,606 B1 | 3/2005 | Major et al. | |
| 6,865,188 B1 | 3/2005 | Stirling et al. | |
| 6,873,625 B1 | 3/2005 | Yoo et al. | |
| 6,903,716 B2 | 6/2005 | Kawabe et al. | |
| 6,909,442 B2 | 6/2005 | Hiyama et al. | |
| 6,914,637 B1 | 7/2005 | Wolf et al. | |
| 6,963,968 B2 | 11/2005 | Kori | |
| 6,973,069 B1 | 12/2005 | Spear et al. | |
| 6,975,645 B1 | 12/2005 | Suzuki et al. | |
| 7,046,631 B1 | 5/2006 | Giroux et al. | |
| 7,075,987 B2 | 7/2006 | Kim et al. | |
| 7,099,277 B2 | 8/2006 | Sahinoglu et al. | |
| 7,136,415 B2 | 11/2006 | Yun et al. | |
| 7,177,329 B2 | 2/2007 | Kobayashi et al. | |
| 7,194,554 B1 | 3/2007 | Short et al. | |
| 7,248,590 B1 | 7/2007 | Liu | |
| 7,256,790 B2 | 8/2007 | Valmiki et al. | |
| 7,295,578 B1 | 11/2007 | Lyle et al. | |
| 7,453,479 B2 * | 11/2008 | Le et al. | 345/698 |
| 7,525,975 B2 | 4/2009 | Caspi et al. | |
| 2001/0030649 A1 | 10/2001 | Mamiya et al. | |
| 2001/0036193 A1 | 11/2001 | Kori | |
| 2001/0038387 A1 | 11/2001 | Tomooka et al. | |
| 2002/0007452 A1 | 1/2002 | Traw et al. | |
| 2002/0011996 A1 | 1/2002 | Inoue et al. | |
| 2002/0060676 A1 | 5/2002 | Kim | |
| 2002/0061024 A1 | 5/2002 | Malkemes et al. | |
| 2002/0062394 A1 | 5/2002 | Bunn et al. | |
| 2002/0071055 A1 | 6/2002 | Ooshima et al. | |
| 2002/0071390 A1 | 6/2002 | Reeves et al. | |
| 2002/0075902 A1 | 6/2002 | Abbas et al. | |
| 2002/0080468 A1 | 6/2002 | Crummey et al. | |
| 2002/0085582 A1 | 7/2002 | Kim | |
| 2002/0089517 A1 | 7/2002 | Ludtke et al. | |
| 2002/0122515 A1 | 9/2002 | Bodenschatz | |
| 2002/0136219 A1 | 9/2002 | Ding et al. | |
| 2002/0149617 A1 | 10/2002 | Becker | |
| 2002/0163598 A1 | 11/2002 | Pasqualino | |
| 2002/0164022 A1 | 11/2002 | Strasser et al. | |
| 2002/0184327 A1 | 12/2002 | Major et al. | |
| 2002/0190974 A1 | 12/2002 | Morita | |
| 2002/0190978 A1 | 12/2002 | Agarwal et al. | |
| 2003/0035442 A1 | 2/2003 | Eng | |
| 2003/0048852 A1 | 3/2003 | Hwang et al. | |
| 2003/0063077 A1 | 4/2003 | Koyama | |
| 2003/0076282 A1 | 4/2003 | Ikeda et al. | |
| 2003/0080971 A1 | 5/2003 | Hochmuth et al. | |
| 2003/0112822 A1 | 6/2003 | Hong et al. | |
| 2003/0145258 A1 | 7/2003 | Warner et al. | |
| 2003/0149987 A1 | 8/2003 | Pasqualino et al. | |
| 2003/0152160 A1 | 8/2003 | Bauch et al. | |
| 2003/0174156 A1 | 9/2003 | Katsuhara et al. | |
| 2003/0174795 A1 | 9/2003 | Bruhnke et al. | |
| 2003/0177423 A1 | 9/2003 | Komatsu et al. | |
| 2003/0212811 A1 | 11/2003 | Thornton | |
| 2004/0049705 A1 | 3/2004 | Liebenow | |
| 2004/0080671 A1 | 4/2004 | Siemens et al. | |
| 2004/0081151 A1 | 4/2004 | Greis et al. | |
| 2004/0088469 A1 * | 5/2004 | Levy | 710/316 |
| 2004/0103333 A1 | 5/2004 | Martwick et al. | |
| 2004/0114607 A1 | 6/2004 | Shay et al. | |
| 2004/0198386 A1 | 10/2004 | Dupray | |
| 2004/0203383 A1 | 10/2004 | Kelton et al. | |
| 2004/0210805 A1 | 10/2004 | Kimelman et al. | |
| 2004/0218598 A1 | 11/2004 | Kobayashi | |
| 2004/0218599 A1 | 11/2004 | Kobayashi | |
| 2004/0218624 A1 | 11/2004 | Kobayashi | |
| 2004/0218625 A1 | 11/2004 | Kobayashi | |
| 2004/0218627 A1 | 11/2004 | Kobayashi | |
| 2004/0221056 A1 | 11/2004 | Kobayashi | |
| 2004/0221180 A1 | 11/2004 | Enami et al. | |
| 2004/0221312 A1 | 11/2004 | Kobayashi | |
| 2004/0221315 A1 | 11/2004 | Kobayashi | |
| 2004/0228365 A1 | 11/2004 | Kobayashi | |
| 2004/0233181 A1 | 11/2004 | Kobayashi | |
| 2004/0240454 A1 | 12/2004 | Yamauchi et al. | |
| 2004/0243905 A1 | 12/2004 | Merritt | |
| 2005/0062711 A1 | 3/2005 | Kobayashi | |
| 2005/0066085 A1 | 3/2005 | Kobayashi | |
| 2005/0103333 A1 | 5/2005 | Bonutti | |
| 2005/0225547 A1 | 10/2005 | Choi | |
| 2006/0036788 A1 | 2/2006 | Galang et al. | |
| 2006/0059092 A1 | 3/2006 | Burshan et al. | |
| 2006/0117371 A1 | 6/2006 | Margulis | |
| 2006/0209890 A1 | 9/2006 | MacMullan et al. | |
| 2007/0049086 A1 | 3/2007 | Sakane | |
| 2007/0097885 A1 | 5/2007 | Traversat et al. | |
| 2007/0140298 A1 | 6/2007 | Eng | |
| 2008/0175277 A1 | 7/2008 | Yin et al. | |
| 2008/0284761 A1 | 11/2008 | Knee et al. | |

FOREIGN PATENT DOCUMENTS

| | | |
|---|---|---|
| EP | 0 354 480 A | 2/1990 |

| | | | |
|---|---|---|---|
| EP | 0 385 449 A1 | 9/1990 |
| EP | 0 674 440 A2 | 9/1995 |
| EP | 0 674 441 A1 | 9/1995 |
| EP | 0788048 A1 | 6/1997 |
| EP | 1 041 823 A2 | 10/2000 |
| EP | 1 069 721 A2 | 1/2001 |
| EP | 1089503 A2 | 4/2001 |
| EP | 1 154 354 A | 11/2001 |
| EP | 1 229 690 A | 8/2002 |
| EP | 1 251 664 A2 | 10/2002 |
| EP | 1 432 203 | 6/2004 |
| EP | 1 473 700 | 11/2004 |
| EP | 1 517 292 A2 | 3/2005 |
| EP | 1 519 349 A2 | 3/2005 |
| EP | 1 519 581 A1 | 3/2005 |
| GB | 2 329 741 A | 3/1999 |
| JP | 10145309 | 5/1998 |
| JP | 11175045 A | 7/1999 |
| JP | 2001/218082 A | 8/2001 |
| JP | 2001036900 | 9/2001 |
| JP | 2002304168 A | 10/2002 |
| SG | 110144 | 4/2005 |
| WO | WO 95/00917 A1 | 1/1995 |
| WO | 95/13681 | 5/1995 |
| WO | WO 98/41008 A2 | 9/1998 |
| WO | WO 99/63513 | 12/1999 |
| WO | WO 00/20974 A1 | 4/2000 |
| WO | 02/25822 A2 | 3/2002 |
| WO | WO02/25885 | 3/2002 |
| WO | WO02/065746 | 8/2002 |
| WO | WO03/058376 | 7/2003 |
| WO | WO 03/058376 | 7/2003 |

OTHER PUBLICATIONS

"Packet", http://en.wikipedia.org/wiki/Packet.*
U.S. Office Action mailed Aug. 9, 2005 from U.S. Appl. No. 10/726,438.
U.S. Office Action mailed Aug. 9, 2005 from U.S. Appl. No. 10/727,131.
U.S. Office Action mailed Aug. 5, 2005 from U.S. Appl. No. 10/726,934.
Chang et al., "Digital Visual Interface," Technology Brief, Dell, May 2000.
"Digital Visual Interface (DVI), Revision 1.0," Apr. 2, 1999, http://wwwddwg.org/lib/dvi_10.pdf, Figures 2-1, 3-1, 4-1; sections 1.32, 2.1, 2.2.5, 2.6, 3.1.4, 3.3, 4.1; pp. 8, 10, 14-15, 23-25, 30-31, 33-34.
Office Action mailed Aug. 5, 2005 from U.S. Appl. No. 10/726,934.
Office Action mailed Aug. 9, 2005 from U.S. Appl. No. 10/726,438.
Office Action mailed Aug. 9, 2005 from U.S. Appl. No. 10/727,131.
Office Action mailed Nov. 1, 2005 from U.S. Appl. No. 10/726,438.
Office Action mailed Nov. 1, 2005 from U.S. Appl. No. 10/727,131.
Office Action mailed Nov. 2, 2005 from U.S. Appl. No. 10/726,802.
Jun Hanari and Manabu Watanabe et al., "15.2: Development of an UXGA Display System by a Digital Packet Video Link," SID 01 Digest, vol. XXXII, Jun. 5, 2001, pp. 210-213, XP007007646, paragraphs 0001-0003.
Kasai N. et al., "Digital Packet Video Link 1-9 for Super High Resolution Display," IEICE Transactions on Electronics, Electronics Society, Tokyo, JP, vol. E84-C, No. 11, Nov. 2001, pp. 1630-1636, XP001110772, ISSN: 0916-8524, paragraphs 0001, 0002.
International Search Report dated Dec. 8, 2005 from European Patent Application No. 04255609.2.
Examination Report dated March 15, 206 from European Patent Application No. 04255610.0.
Examination/Search Report dated Mar. 1, 2006 from related Singapore Patent Application No. 200402057-4.
Bloks, RHJ, "The IEEE-1934 high speed serial bus," Philips Journal of Research, Elsevier, Amsterdam, NL, vol. 50, No. 1, 1996, pp. 209-216, XP004008212 ISSN: 0165-5817.
Wickelgren, IJ, "The Facts About Firewire," IEEE Spectrum, IEEE Inc., New York, US, vol. 34, No. 4, Apr. 1997, pp. 19-25, XP002051393, ISSN: 0018-9235.

International Search Report dated Jun. 14, 2006 from European Patent Application No. 04252055.1.
Examination Report dated Jul. 5, 2006 from European Patent Application No. 04255611.8.
SG Examination and Search Report dated Feb. 16, 2007 from corresponding SG Application No. 200401973-3.
SG Examination and Search Report dated Feb. 16, 2007 from SG Application No. 200401979-0.
SG Examination and Search Report dated Feb. 16, 2007 from SG Application No. 200402060-8.
SG Examination and Search Report dated Feb. 16, 2007 from SG Application No. 200402061-6.
SG Examination and Search Report dated Feb. 9, 2007 from SG Application No. 200401166-4.
SG Examination and Search Report dated Feb. 9, 2007 from SG Application No. 200401975-8.
SG Search Report and Written Opinion mailed Jul. 16, 2006 from related SG Patent Application No. 200405336-9.
US Office Action mailed Nov. 2, 2005 from U.S. Appl. No. 10/726,802.
US Office Action mailed Apr. 5, 2007 from U.S. Appl. No. 10/726,802.
US Office Action mailed May 30, 2007 from U.S. Appl. No. 10/909,103.
US Office Action mailed Jun. 26, 2007 from U.S. Appl. No. 10/762,680.
US Office Action mailed Jun. 27, 2007 from U.S. Appl. No. 10/726,794.
US Office Action mailed Jul. 9, 2007 from U.S. Appl No. 10/726,895.
SG Search Report dated Oct. 12, 2005 from SG Patent Application No. 200405115-7.
EP Search Report dated Dec. 16, 2004 from EP Patent Application No. 04255786.8.
EP Search Report dated Dec. 2, 2005 from EP Patent Application No. 04255610.0.
"Hi-Bandwidth Digital Content Protection System," Rev. 1.0, Feb. 17, 2000, 60 pgs.
Examination Report dated Nov. 13, 2006 from related European Patent Application No. 04255609.2.
Office Action mailed Dec. 5, 2006 from U.S. Appl. No. 10/726,802.
Office Action mailed Jul. 9, 2007 from related U.S. Appl. No. 10/726,895.
Australian Search Report dated May 15, 2007 issued in corresponding Singapore Application No. 200405099-3.
Examination Report dated Feb. 28, 2006 from European Patent Application No. 04255609.2.
Office Action mailed Jun. 27, 2007 from U.S. Appl. No. 10/726,794.
Office Action mailed Dec. 28, 2007 from U.S. Appl. No. 10/726,895.
Final Rejection mailed Sep. 21, 2007 from U.S. Appl. No. 10/909,103.
Office Action mailed Nov. 12, 2007 from U.S. Appl. No. 10/726,794.
Office Action mailed Jun. 26, 2007 from U.S. Appl. No. 10/762,680.
High-bandwidth Digital Content Protection System, Revision 1.0, Intel Corporation, Feb. 17, 2000.
EPO Exam Report in EP Application No. 04255786.8 dated Jul. 5, 2007.
International Search Report in related Chinese Application No. 200410044503.5 dated Jun. 29, 2007.
Notice of Allowance mailed Sep. 24, 2007 in U.S. Appl. No. 10/726,802.
Supplemental Notice of Allowance mailed Nov. 6, 2007 in U.S. Appl. No. 10/726,802.
Office Action dated Jan. 8, 2008 in U.S. Appl. No. 10/762,680.
Office Action dated Nov. 2, 2007 from Chinese Patent Application No. 2004100950502.4.
Chinese Office Action dated Apr. 4, 2008 in Chinese Application No. 200410047784.X.
Office Action dated Mar. 31, 2008 from U.S. Appl. No. 10/726,794.
European Search Report dated Mar. 28, 2008 in EP Application No. 04252054.4.
Silicon Image, "High-bandwidth Digital Content Protection," White Paper, Feb. 2000, retrieved from the Internet at http://www.siliconimage.com/docs/SiI-WP-002-A.pdf.

Chinese Office Action dated Mar. 28, 2008 in Chinese application No. 200410044503.5.
European Search Report dated Mar. 28, 2008 from EP Application No. 04252203.7.
European Search Report dated Mar. 18, 2008 from EP Application No. 04252202.9.
Austrian Search Report dated Mar. 7, 2008 from Singapore Application No. 200401969-1.
Austrian Examination Report dated Mar. 7, 2008 from Singapore Application No. 200401969-1.
European Search Report dated Mar. 28, 2008 from EP Application No. 04252057.7.
European Search Report dated Apr. 3, 2008 from EP Application No. 04252205.2.7.
Notice of Allowance dated Apr. 25, 2008 from U.S. Appl. No. 10/726,802.
Sung et al., "DVI: A standard for the digital monitor interface," Silicon Image, Inc., Cupertino, CA, 1999, 4 pgs.
Eidson et al., "30.2: HDMI: High-Definition Multimedia Interface," Silicon Image, Inc., Sunnyvale, CA, SID 03 Digest, 2003, pp. 1024-1027.
European Search Report dated Mar. 13, 2008 in EP Application No. 04251582.5.
High-Definition Multimedia Interface Specification, Informational Version 1.0, Sep. 4, 2003, 52 pgs.
European Search Report dated Mar. 13, 2008 in EP Application No. 04252056.9.
Notice of Allowance dated Jan. 29, 2008 in U.S. Appl. No. 10/726,802.
Notice of Allowance dated Mar. 5, 2008 in U.S. Appl. No. 10/909,103.
Office Action dated Jan. 23, 2008 from U.S. Appl. No. 11/747,839.
Examination Report dated Jun. 5, 2008 from European Patent Application No. 04252057.7.
Examination Report dated Jun. 5, 2008 from European Patent Application No. 04251581.7.
Examination Report dated Jun. 5, 2008 from European Patent Application No. 04252202.9.
Office Action dated Jun. 23, 2008 from U.S. Appl. No. 10/762,680.
Examination Report dated Jun. 5, 2008 from European Patent Application No. 04252056.9.
Examination Report dated Jun. 5, 2008 from European Patent Application No. 04252054.4.
Examination Report dated Jun. 5, 2008 from European Patent Application No. 04252203.7.
Chinese Office Action dated Jun. 27, 2008 from Chinese Patent Application No. 200410038432.8.
Office Action dated Jun. 27, 2008 from U.S. Appl. No. 10/909,085.
Chinese Office Action dated Jun. 27, 2008 in Chinese Application No. 200410038546.2.
Office Action dated Jun. 24, 2008 from U.S. Appl. No. 10/726,794.
Search Report dated Jul. 10, 2008 from European Patent Application No. 08153726.8.
Kobayashi, "DisplayPort Technical Overview," http://web.archive.org/web/20060726222849/http://gnss.com/technology/DisplayPort+Technical+Overview+White+Paper.pdf, Jun. 26, 2006.
Office Action dated Jul. 2, 2008 from European Patent Application No. 04252205.2.
Office Action dated Oct. 31, 2008 in Chinese Patent Application No. 200410095171.3.
Office Action dated Oct. 21, 2008 from U.S. Appl. No. 11/747,839.
Office Action dated Apr. 4, 2008 in CN Patent Application No. 200410043419.1.
Search Report dated Jul. 2, 2008 in EP Application No. 08155263.0.
Search Report dated Jun. 30, 2008 in EP Application No. 08155262.2.
Notice of Allowance dated Oct. 1, 2008 in U.S. Appl. No. 10/909,085.
Notice of Allowance dated Oct. 21, 2008 in U.S. Appl. No. 10/762,680.
Office Action dated Sep. 12, 2008 in CN Patent Application No. 200410044503.5.
Office Action dated Aug. 6, 2008 from U.S. Appl. No. 10/726,895.
Office Action dated Aug. 19, 2008 from U.S. Appl. No. 10/726,440.
Search Report dated Jul. 21, 2008 from European Patent Application No. 08153724.3.
Office Action dated Jul. 4, 2008 from Chinese Patent Application No. 200410038545.8.
Office Action dated May 23, 2008 from Chinese Patent Application No. 200410071498.7.
Office Action dated Aug. 8, 2008 from Chinese Patent Application No. 200410045686.2.
Office Action dated Aug. 8, 2008 from Chinese Patent Application No. 200410087460.9.
VESA Display Port Standard, Version 1.1, Mar. 19, 2007.
Office Action dated Aug. 29, 2008 from U.S. Appl. No. 11/742,387.
Office Action dated Nov. 12, 2009 in U.S. Appl. No. 10/726,350.
Office Action dated Oct. 8, 2009 in U.S. Appl. No. 11/776,411.
Office Action dated Apr. 3, 2009 in CN Patent Application No. 200410044503.5.
Notice of Allowance dated Jun. 25, 2009 in U.S. Appl. No. 11/747,839.
Notice of Allowance dated Jul. 8, 2009 in U.S. Appl. No. 10/726,440.
Office Action dated Sep. 17, 2009 in U.S. Appl. No. 10/726,794.
Universal Serial Bus Specification, Revision 2.0, Apr. 27, 2000, p. 143.
Office Action dated Sep. 21, 2009 in U.S. Appl. No. 10/726,895.
Office Action dated Sep. 11, 2009 in U.S. Appl. No. 10/726,441.
Barr, "Copy Protection for High-Definition Baseband Video," Information Technology: Coding and Computing [online at http://ieeexplore.ieee.org/stamp/stamp.jsp?arnumber=844202&isnumber=182 66, Aug. 6, 2002.
Search Report dated Apr. 2, 2009 in EP Application No. 08153454.7.
Office Action dated May 26, 2009 in U.S. Appl. No. 11/742,222.
Universal Serial Bus Specification, Revision 2.0, Apr. 27, 2000, pp. 7, 19, 32-34, 36, 38, 39, 43, 44, 48-51, 58, 66, 67, 72-74, 85, 86, 132, 206-209, 228, 229, 242-244, 269, 270, 278.
Fairhurst, MPEG-2 Transmission, Jan. 2001, pp. 1-9 from Internet at http://www.erg.abdn.ac.uk/research/future-net/digital-video/mpeg2-trans.html.
Office Action dated May 14, 2009 in U.S. Appl. No. 10/726,895.
Office Action dated Apr. 2, 2009 in U.S. Appl. No. 10/726,794.
Office Action dated Mar. 13, 2009 in CN Patent Application No. 200410095171.3.
Office Action dated Mar. 6, 2009 in CN Patent Application No. 200410043419.1.
Office Action dated Mar. 3, 2009 in U.S. Appl. No. 10/726,440.
Office Action dated Jan. 5, 2009 in U.S. Appl. No. 10/726,440.
Office Action dated Mar. 4, 2009 in U.S. Appl. No. 10/726,350.
Notice of Allowance dated Jan. 7, 2009 in U.S. Appl. No. 11/742,387.
Chinese Office Action dated Nov. 28, 2008 in CN Application No. 200410071497.2.

* cited by examiner

High-level diagram of link traffic example

BYPASSING PIXEL CLOCK GENERATION AND CRTC CIRCUITS IN A GRAPHICS CONTROLLER CHIP

CROSS REFERENCE TO RELATED APPLICATIONS

This patent application takes priority under 35 U.S.C. 119 (e) to (i) U.S. Provisional Patent Application No. 60/504,060 filed on Sep. 18, 2003, entitled "DIGITAL/ANALOG VIDEO INTERCONNECT AND METHODS OF USE THEREOF" by Kobayashi, and (ii) U.S. Provisional Patent Application No. 60/562,737 filed on Apr. 15, 2004, entitled "BYPASSING PIXEL CLOCK GENEARATION AND CRTC CIRCUITS IN A GRAPHICS CONTROLLER CHIP" by Kobayashi each of which are hereby incorporated by reference herein in their entirety. This application is also related to the following co-pending U.S. Patent applications each of which are incorporated by reference, (i) U.S. patent application Ser. No. 10/726,802, entitled "METHOD OF ADAPTIVELY CONNECTING A VIDEO SOURCE AND A VIDEO DISPLAY" naming Kobayashi as inventor; (ii) U.S. patent application Ser. No. 10/726,438, entitled "METHOD AND APPARATUS FOR EFFICIENT TRANSMISSION OF MULTIMEDIA DATA PACKETS" naming Kobayashi as inventor; (iii) U.S. patent application Ser. No. 10/726,440, entitled "METHOD OF OPTIMIZING MULTIMEDIA PACKET TRANSMISSION RATE", naming Kobayashi as inventor; (iv) U.S. patent application Ser. No. 10/727,131, entitled "USING AN AUXILARY CHANNEL FOR VIDEO MONITOR TRAINING", naming Kobayashi as inventor; (v) U.S. patent application Ser. No. 10/726,350, entitled "TECHNIQUES FOR REDUCING MULTIMEDIA DATA PACKET OVERHEAD", naming Kobayashi as inventor; (vi) U.S. patent application Ser. No. 10/726,362, entitled "PACKET BASED CLOSED LOOP VIDEO DISPLAY INTERFACE WITH PERIODIC STATUS CHECKS", naming Kobayashi as inventor; (vii) U.S. patent application Ser. No. 10/726,895, entitled "MINIMIZING BUFFER REQUIREMENTS IN A DIGITAL VIDEO SYSTEM", naming Kobayashi as inventor; and (viii) U.S. patent application Ser. No. 10/726,441, entitled "VIDEO INTERFACE ARRANGED TO PROVIDE PIXEL DATA INDEPENDENT OF A LINK CHARACTER CLOCK", naming Kobayashi as inventor; (ix) U.S. patent application Ser. No. 10/726,934, entitled "ENUMERATION METHOD FOR THE LINK CLOCK RATE AND THE PIXEL/AUDIO CLOCK RATE", naming Kobayashi as inventor, and (x) U.S. patent application Ser. No. 10/726,794, entitled "PACKET BASED VIDEO DISPLAY INTERFACE AND METHODS OF USE THEREOF" naming Kobayashi as inventor. This application is also related to the following co-pending applications: (x) U.S. patent application Ser. No. 10/909,103, entitled "USING PACKET TRANSFER FOR DRIVING LCD PANEL DRIVER ELECTRONICS" filed Jul. 29, 2004, naming Kobayashi as inventor; and (xi) U.S. patent application Ser. No. 10/909,085, entitled "PACKET BASED STREAM TRANSPORT SCHEDULER AND METHODS OF USE THEREOF" filed Jul. 29, 2004, naming Kobayashi as inventor.

BACKGROUND

I. Field of the Invention

The invention relates to display devices. More specifically, the invention describes a method and apparatus for using driving LCD panel drive electronics.

Overview

Until most recently, almost all TVs in use today rely on a device known as the cathode ray tube, or CRT, to display their images. In order to display an image on the entire screen, electronic circuits inside the TV use magnetic deflection coils (a horizontal deflection coil to move the beam from left to right and a vertical deflection coil to move the beam up and down) to move the electron beam in a "raster scan" pattern across and down the screen. FIG. 1 illustrates a raster 100 on a conventional cathode ray tube where an electron beam paints one line across the screen from left to right 102a and then quickly moves back to the left side 104, and paints another horizontal line 102b, while continuously moving down slightly. When the beam reaches the right side of the bottom line 107, it is moved back to the upper left corner of the screen, as represented by line 106. When the beam is "painting" lines 102 it is on, and when it is "retracing" lines 104, it is off so that it does not leave a trail on the screen. The term horizontal retrace is used to refer to the beam moving back to the left at the end of each line, while the term vertical retrace refers to its movement from the bottom to the top of the raster 106.

In order to display an image on a CRT display screen, each image is transmitted as a sequence of frames each of which includes a number of horizontal scan lines. Typically, time reference signals are provided in order to divide the video signal into horizontal scan lines and frames. These reference signals include a VSYNC signal that indicates the beginning of a frame and an HSYNC signal that indicates the beginning of a next source scan line. In this way, the image is divided into a number of points where each point is displayed as a pixel having a corresponding pixel clock that specifies the rate at which pixels are generated (in pixels per second). Therefore, in order to display video data from a video source, such as a CPU, DVD player, etc., the video data is processed by a conventional video processor unit (VPU) that converts the incoming video data (at a native format) to a video data at a video display format at a clock rate determined by a memory unit into which the data is temporarily stored.

A cathode ray tube (CRT) controller unit then converts the display formatted video data to CRT compatible display timing by adding timing and control signals (such Hsync and Vsync) regardless of the whether or not the display unit is a cathode ray tube based display or a fixed pixel display such as an LCD. In this way, the CRT controller unit converts the video data that is read from the video source to a pixel clock rate $\Phi_{pixel}$ based solely upon the assumption that the display requires CRT type signals. It should be noted therefore, that strictly based upon CRT legacy considerations, the incoming video signal has been converted from a native video clock $\Phi_{native}$ to a pixel clock $\Phi_{pixel}$ and then sent to the display unit at a link rate LR that must be faster than the pixel clock $\Phi_{pixel}$. At the display, the video signal must then be processed again by a pixel clock regenerator circuit in order for the video data to be properly displayed.

Therefore, even in those situations where a pixel clock rate is not meaningful (such as with fixed pixel displays, such as LCDs), conventional video processors require that a CRT controller unit force a video signal that will not be displayed on a CRT type display to conform to legacy CRT requirements.

Therefore, in those cases where a display is not CRT based, a video processor that does not enforce CRT legacy requirements is desirable.

SUMMARY OF THE INVENTION

What is provided is a video processor architecture embodied as a method, apparatus, and system suitable for implementation with digital displays, such as liquid crystal displays (LCDs), that provides a video signal that is directly related to a memory clock rate and independent of a pixel rate.

In a video processor unit, a method of providing a video data stream at a clock rate that is independent of a pixel clock rate. Receiving native video data from a video source at a native clock rate, storing the video data in a memory unit, reading selected portions of the video data at a memory clock rate, rasterizing the selected video data, packetizing the rasterized video data, sending the packetized video data to a display unit by way of a link at a link rate, wherein the link rate is directly related to the memory clock rate.

In another embodiment, a video processor for displaying video data on a non-CRT type display unit coupled thereto by way of a link is disclosed that includes a video memory unit having an associated memory clock rate and a video packet transmitter unit for transmitting the video data to the non-CRT type display in the form of video data packets at a link rate that is directly related to the memory clock rate $\Phi_{memory}$ such that the video processor does not require a CRT controller unit.

In still another embodiment, a configurable video processor for providing displayable video data to a display unit coupled thereto is disclosed. The video processor includes a CRTC circuit, a selectable CRT controller circuit coupled to the CRTC circuit and a raster engine coupled to the selectable CRT controller circuit. The processor also includes a display interrogator unit coupled to the display unit and the selectable CRT controller circuit for determining a display type corresponding to the display unit, wherein when the display type is a non-CRT type display, the display interrogator unit sends a first signal to the selectable CRT controller circuit that disables (if enabled) the CRTC circuit such that the displayable video data is sent directly to the display unit from the raster engine and wherein when the display interrogator determines that the display is a CRT type display, then the display interrogator sends a second signal to the selectable CRT controller circuit that enables the CRTC circuit (if disabled) such that the displayable video data is processed by the CRTC circuit prior to being sent to the display unit by way of the link.

DETAILED DESCRIPTION OF SELECTED EMBODIMENTS

Figure 1:
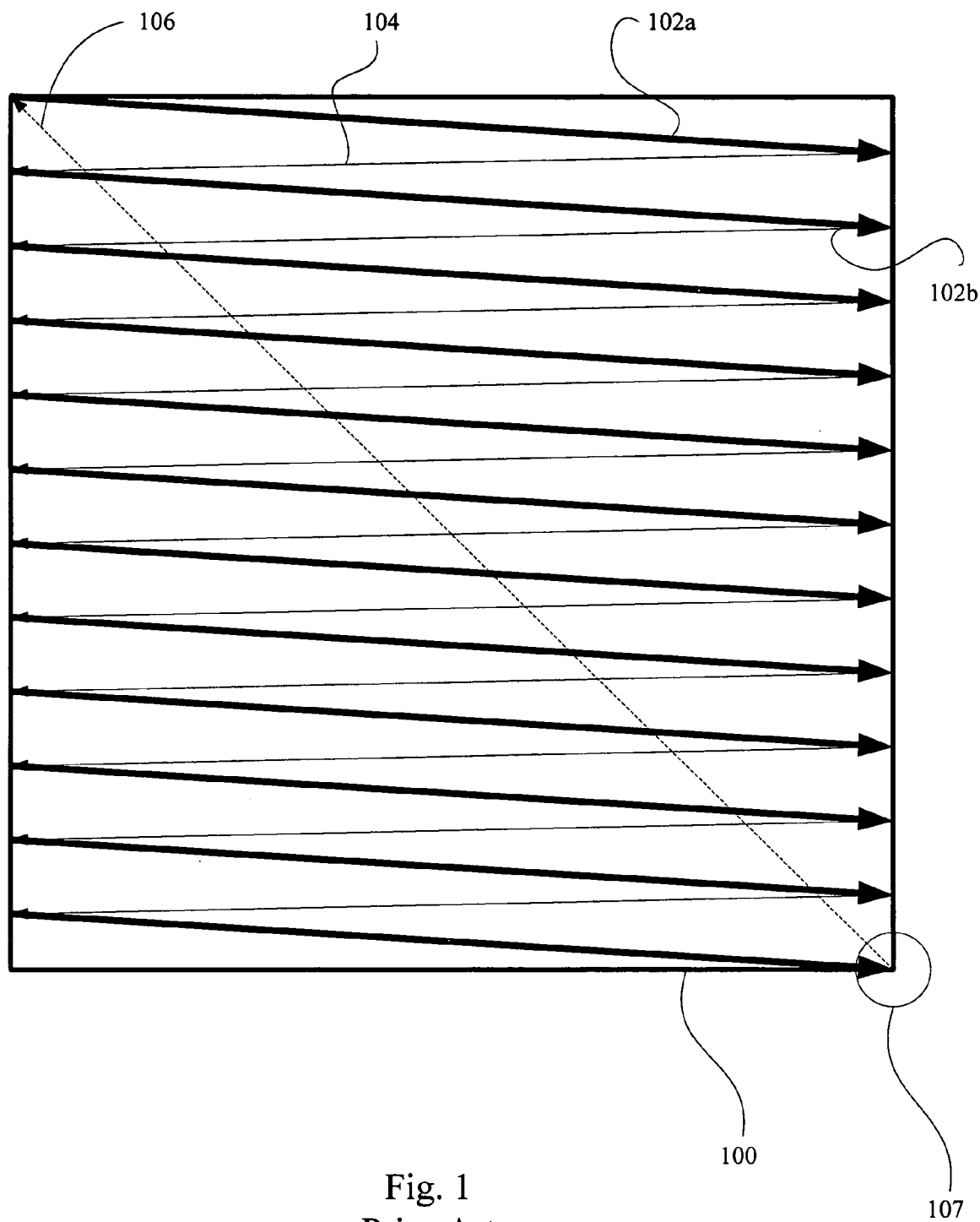
FIG. 1 illustrates a raster on a conventional cathode ray tube.

Reference will now be made in detail to a particular embodiment of the invention an example of which is illustrated in the accompanying drawings. While the invention will be described in conjunction with the particular embodiment, it will be understood that it is not intended to limit the invention to the described embodiment. To the contrary, it is intended to cover alternatives, modifications, and equivalents as may be included within the spirit and scope of the invention as defined by the appended claims.

Until most recently, almost all TVs in use today rely on a device known as the cathode ray tube, or CRT, to display their images. In order to display an image on the entire screen, electronic circuits inside the TV use magnetic deflection coils (a horizontal deflection coil to move the beam from left to right and a vertical deflection coil to move the beam up and down) to move the electron beam in a "raster scan" pattern across and down the screen. In order to display video data from a video source, such as a CPU, DVD player, etc., the video data provided by a video source at a native clock rate $\Phi_{native}$ is processed by a conventional video processor unit (VPU) by storing the video data in a video memory unit until such time as it is read from the memory at a memory clock rate $\Phi_{memory}$ and processed by a raster engine that converts the video data native format to a video signal having a displayable format based upon the characteristics of the display unit for which the image will be displayed.

A cathode ray tube (CRT) controller unit then converts the video signal using display timing by adding timing and control signals (such Hsync and Vsync) regardless of the whether or not the display unit is a cathode ray tube based display or a fixed pixel display such as an LCD. In this way, the CRT controller unit converts the video data that is read from the memory unit at the memory clock rate $\Phi_{memory}$ to a pixel clock rate $\Phi_{pixel}$ based solely upon the assumption that the display requires CRT type signals. Once the CRT controller unit has added the CRT based control and timing signals, the video signal is then passed by way of a link to the display unit at a link rate LR. Therefore, even in those situations where a pixel clock rate is not meaningful (such as with fixed pixel displays, such as LCDs), conventional video processors require that a CRT controller unit force a video signal that will not be displayed on a CRT type display to conform to legacy CRT requirements.

Accordingly, the invention describes a method, system, and apparatus that does not enforce CRT legacy requirements for those situations where a video is to be displayed on a non-CRT type display unit, such as an LCD. More specifically, the inventive video processor does not force the video signal to conform to a pixel clock but preserves the memory clock rate by transmitting the video data in video data packets at a link rate that is directly related to the memory clock rate. In this way, the inventive video processor does not require a CRT controller unit for those situations where a display unit so connected is not a CRT type display. In some embodiments, the inventive processor is dedicated to a fixed pixel display and therefore does away with the CRT controller and associated circuitry entirely whereas in other embodiments, in order to maintain compatibility with all possible display environments, a selectable CRT controller circuit is included. The selection (or de-selection) of the CRT controller and associated circuitry is based upon a query of the display attributes during an initialization process whereby the video processor queries the display whether or not it is a CRT type display.

The invention will now be described in terms of a representative LCD panel. However, it should be noted that any digital fixed pixel display, be it LCD, plasma, DLP based, is also suitable and therefore the use of an LCD panel in the following description should not be considered to limit either the scope or the intent of the invention. It should be noted that the invention is also well suited to be used in conjunction with any packet based video display interface such as described in copending U.S. patent application Ser. No. 10/726,794 entitled "PACKET BASED VIDEO DISPLAY INTERFACE AND METHODS OF USE THEREOF" by Kobayashi filed Dec. 3, 2003 and U.S. patent application Ser. No. 10/909,103 entitled "USING PACKET TRANSFER FOR DRIVING LCD PANEL DRIVER ELECTRONICS" by Kobayashi filed concurrently with this application each of which are incorporated herein by reference for all purposes.

Figure 2:
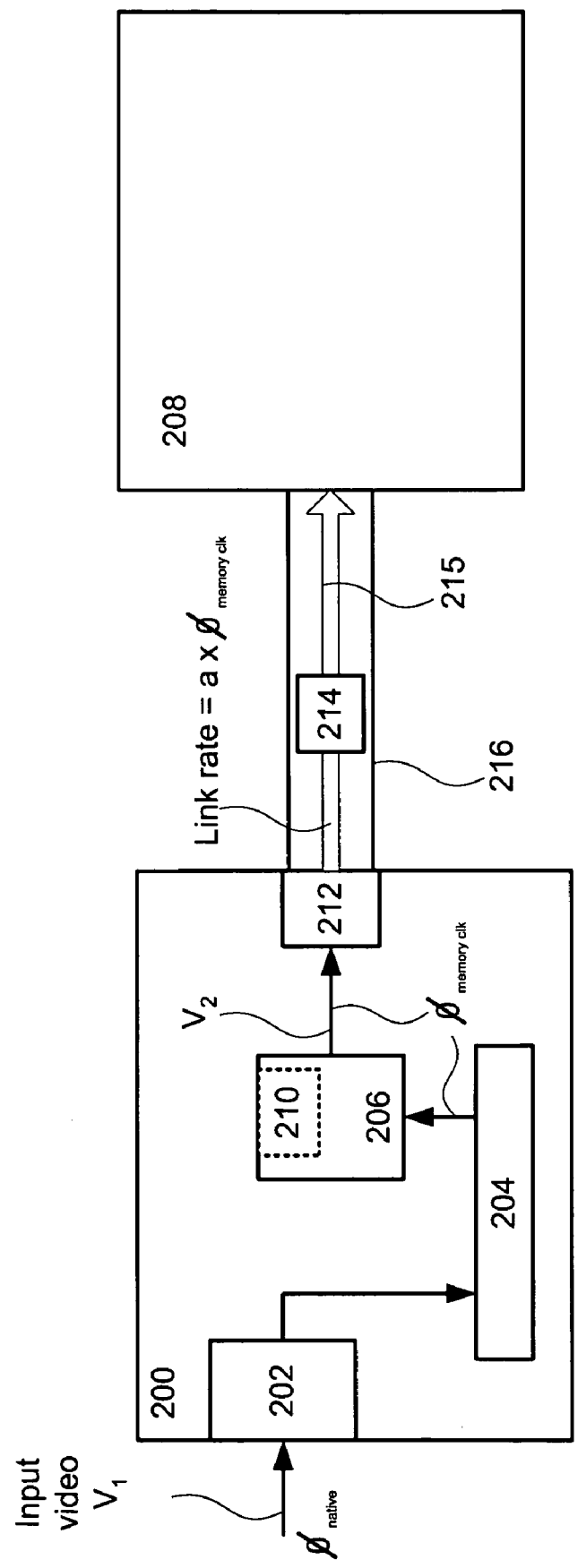
FIG. 2 shows an exemplary video processor unit (VPU) in accordance with an embodiment of the invention.

Accordingly, FIG. 2 shows an exemplary video processor unit (VPU) 200 in accordance with an embodiment of the invention. The VPU 200 includes an interface 202 coupled to a video source (not shown) such as a CPU, DVD player, etc. capable of providing a video signal $V_1$ at a native clock rate $\Phi_{native}$ and a native video format. It should be noted that the video source can include either or both a digital image (i.e. still or digital video) source and/or an analog image (i.e., still or analog video) source. Accordingly, the video source provides various video signals that can have any number and type of well-known formats, such as composite video, serial digital, parallel digital, RGB, or consumer digital video. The video signal can be an analog video signal provided the source includes some form of an analog video source such as for example, an analog television, still camera, analog VCR, DVD player, camcorder, laser disk player, TV tuner, set top box (with satellite DSS or cable signal) and the like. The source can also include a digital image source such as for example a digital television (DTV), digital still camera, and the like. The digital video signal can be any number and type of well known digital formats such as, SMPTE 274M-1995 (1920×1080 resolution, progressive or interlaced scan), SMPTE 296M-1997 (1280×720 resolution, progressive scan), as well as standard 480 progressive scan video.

Once received, the video data $V_1$ is then stored (by way of a write/modify operation) in a video memory unit 204 coupled to the interface 202 at a memory space location corresponding to the video window being displayed. In most cases, the memory unit 204 is of a size sufficient to store at least a full frame of video data In order to display the video data stored in the memory unit 204, selected portions of the video data $V_1$ are read from the memory 204 at a memory clock rate $\Phi_{memory}$ and processed by a raster engine 206 that converts the video data native format to a video signal $V_2$ having a displayable format based upon the characteristics of a display unit 208. For example, if the native format is 8 bit video data and the display unit 208 requires 24 bit video data, then the raster engine 206 has the option of utilizing a color look up table (CLUT) 210 in the conversion process.

Once the video signal $V_2$ has been properly formatted for display on the display unit 208, a packetizer 212 packetizes the video signal $V_2$ into a number of data packets 214 in the form of a data stream 215. The data stream 215 is transmitted to the display 208 by way of a link 216 at a transmission rate referred to as a link rate LR that is independent of the native stream rate $\Phi_{native}$ of the video data but is, however, directly related to the memory clock rate $\Phi_{memory}$ (i.e., LR=α× $\Phi_{memory}$). In the described embodiment, the speed, or link rate, of the link 216 can be configured to include a number of logical data channels (not shown) that can be adjusted to compensate for link conditions. For example, at 2.5 Gbps per channel, the link 216 can support SXGA 60 Hz with a color depth of 18 bits per pixel over a single channel. It should be noted that a reduction in the number of channels reduces not only the cost of interconnect, but also reduces the power consumption which is an important consideration (and desirable) for power sensitive applications such as portable devices and the like. However, by increasing the number of channels to four, the link 216 can support WQSXGA (3200× 2048 image resolution) with a color depth of 24-bits per pixel at 60 Hz. or QSXGA (2560×2048) with a color depth of 18-bits per pixel at 60 Hz, without data compression. Even at the lowest rate of 1.0 Gbps per channel, only two channels are required to support an uncompressed HDTV (i.e., 1080i or 720p) data stream.

It should be noted, however, that the bandwidth of the link 216 must be greater than the aggregate bandwidth of all data stream(s) being transmitted over the link 216. In this way, the data packets 214 are received by and appropriately processed by a properly configured display 208 an example of which is described below without the need to generate a pixel clock at either the VPU 200 or the display 208. In one embodiment, the VPU 200 can optionally include a switch coupled to a CRT controller unit that provides the necessary CRT control signals and timing only in those cases where the display is a legacy CRT type display. In this way, the VPU can be used for any type display.

Figure 3:
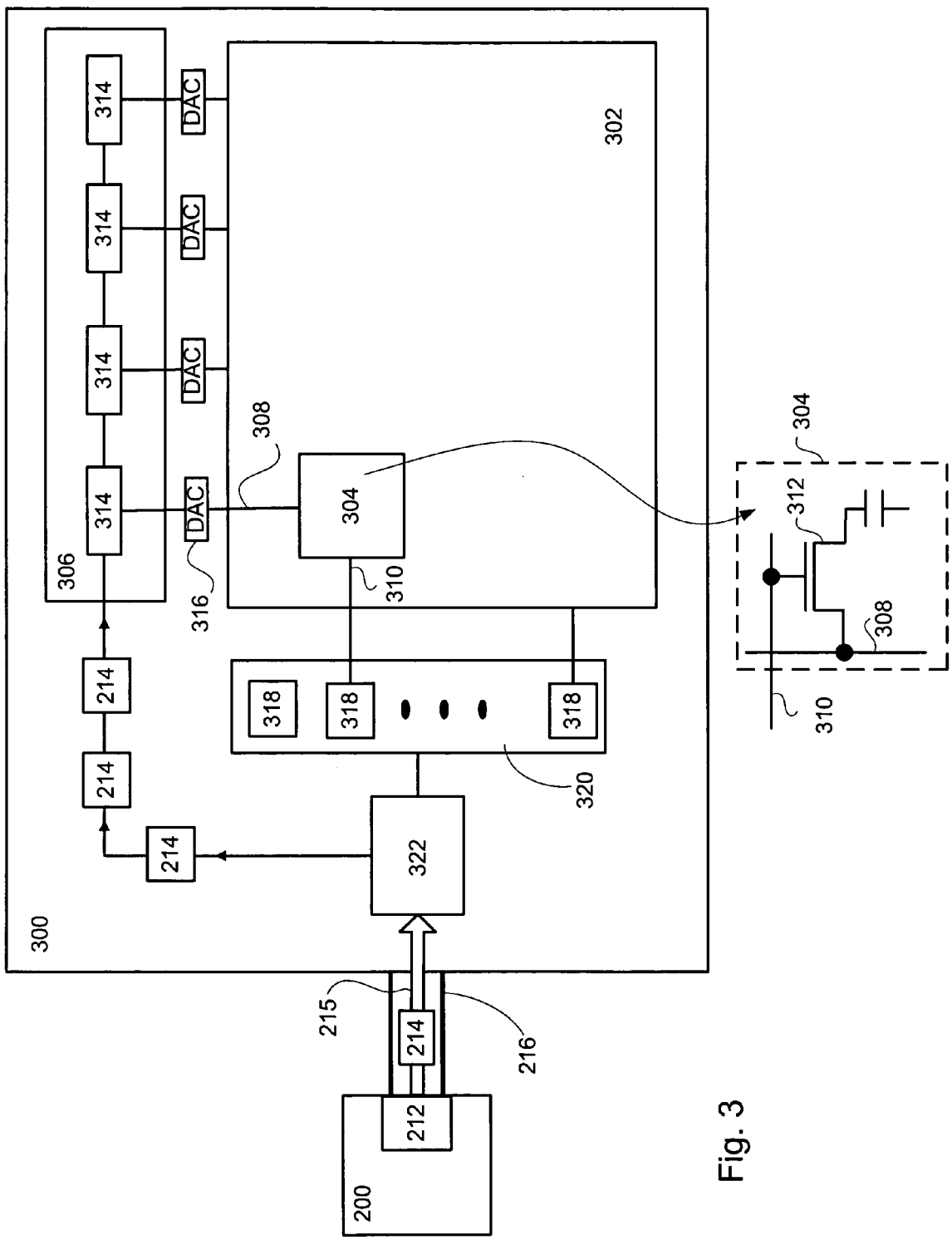
FIG. 3 shows an exemplary LCD display suitable for use with the VPU shown in FIG. 3.

FIG. 3 shows an exemplary LCD display 300 suitable for use with the VPU 200. Accordingly, the LCD display 300 includes an LCD panel 302 having a number of picture elements 304 (pixels) that are arranged in a matrix connected to a data driver 306 by way of a plurality of data lines 308 and a plurality of gate lines 310. In the described embodiment, these picture elements 304 take the form of a plurality of thin film transistors (TFTs) 312 that are connected between the data lines 308 and the gate lines 310. During operation, each of a number of data latches 314 into which video data is stored, outputs digital data signals to an associated digital to analog converter (DAC) 316 by way of the data lines 308. Concurrently, each of a number of logic circuits 318 included in a gate driver 320 outputs a predetermined scanning signal to the gate lines 310 in sequence at timings that are in sync with a horizontal synchronizing signal. In this way, the TFTs 312 are turned ON when the predetermined scanning signal is supplied to the gate lines 310 to transmit the analog data signals supplied by the DACs 316 by way of the data lines 408 that ultimately drive selected ones of the picture elements 304.

In order to transmit the video data, the VPU 200 forms the data stream 215 that includes a number of the data packets 214 which are then received and processed by a display interface 322. In the described embodiment, the data packets 214 are then forwarded to directly to the data latches 314 included in the column driver 306 in such a way that all the video data (in the form of pixel data) used for the display of a particular frame line n of the video frame is provided to the data latches 314 within a line period τ. Therefore, once each data latch 314 has appropriate pixel data stored therein, the data driver 306 drive appropriate ones of the TFTs 312 in the LCD array 302.

Figure 4:
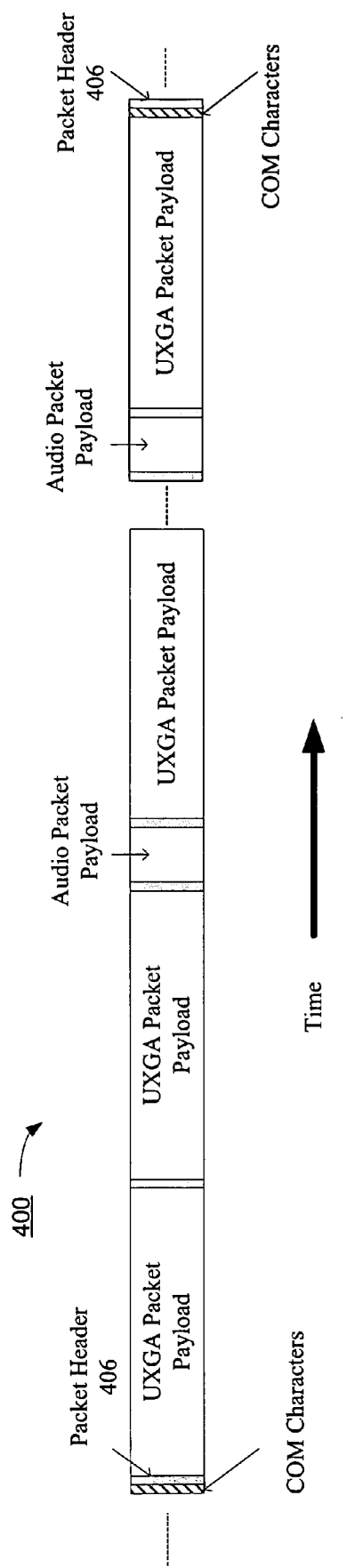
FIG. 4 shows a high-level diagram of a data stream for transmission over the link in accordance with an embodiment of the invention.

FIG. 4 shows a high-level diagram of a data stream 400 for transmission over the link 216 formed of a number of video data packets 402 and audio data packets 404 multiplexed into the single data stream 400. In this example the video data packets 402 are consistent with UXGA graphics 1280×720p video (Stream ID=1) having an associated audio in the form of the audio packets 504 (Stream ID=2). In this example, each frame line is formed of at least 1280 pixels (or 3840 sub-pixels) therefore requiring 3840 data latches be used to store a single frame line of video data within the line period τ. For example, in one embodiment, when the data stream 400 is received at the display interface 322, a group of 3840 data packets (as defined by corresponding packet headers 406) are stored in a memory that takes the form of a frame buffer or a line buffer. It should also be noted, however, that the memory can be bypassed or be absent altogether if a strictly pipelined architecture is desired.

Figure 5:
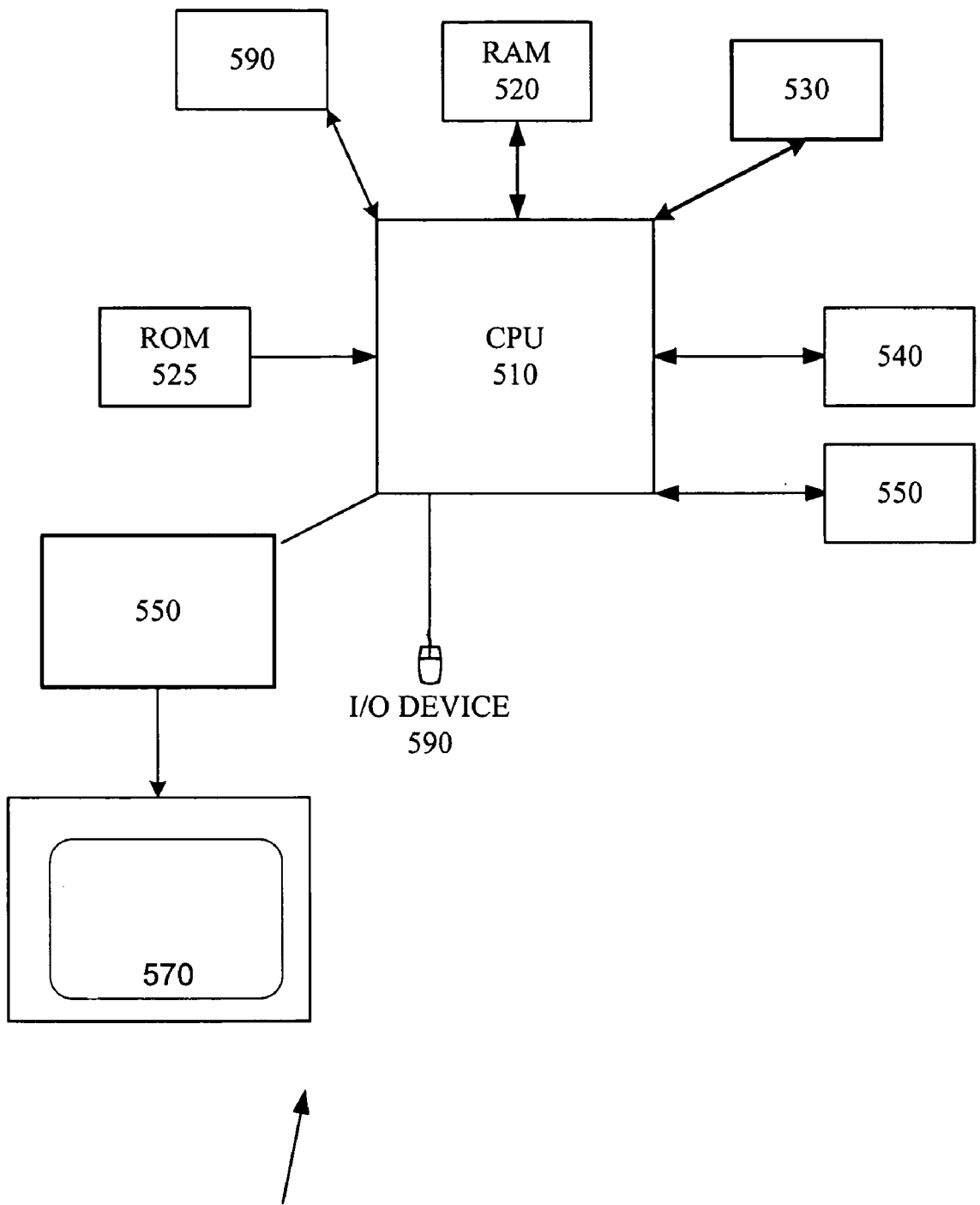
FIG. 5 illustrates a system that can be used to implement the invention.

FIG. 5 illustrates a system 500 that can be used to implement the invention. The system 500 is only an example of a graphics system in which the present invention can be implemented. System 500 includes central processing unit (CPU) 510, random access memory (RAM) 520, read only memory (ROM) 525, one or more peripherals 530, graphics controller 560, primary storage devices 540 and 550, and digital display unit 570. CPU 510 is also coupled to one or more input/output devices 590. Graphics controller 560 generates image data and corresponding reference signals, and provides both to digital display unit 570. The image data can be generated, for example, based on pixel data received from CPU 510 or from an external circuitry.

Although only a few embodiments of the present invention have been described, it should be understood that the present invention may be embodied in many other specific forms without departing from the spirit or the scope of the present invention. The present examples are to be considered as illustrative and not restrictive, and the invention is not to be limited to the details given herein, but may be modified within the scope of the appended claims along with their full scope of equivalents.

While this invention has been described in terms of a preferred embodiment, there are alterations, permutations, and equivalents that fall within the scope of this invention. It should also be noted that there are many alternative ways of implementing both the process and apparatus of the present invention. It is therefore intended that the invention be interpreted as including all such alterations, permutations, and equivalents as fall within the true spirit and scope of the present invention.

What is claimed is:

1. A pipelined method of displaying video data at a display unit, the display unit comprising: a display unit interface, a single line buffer used for storing video data to be displayed, the single line buffer having a size in accordance with a scan line for display;

and a plurality of display elements, the method comprising:
(a) receiving video data packets associated with the scan line for display at the display unit interface;
(b) directly populating the single line buffer using the video data packets received at the display unit interface within a line period τ, the line period τ corresponding to the scan line for display;
(c) only when the single line buffer is full, passing the video data stored in the single line buffer directly to selected of the plurality of display elements, corresponding to the scan line for display; and
(d) concurrently with passing the video data (c), directly populating the single line buffer using video data packets received at the display unit interface, the received video data packets associated with a next scan line for display.

2. The method of claim 1, wherein the display unit does not generate a clock signal.

3. The method of claim 1, wherein each of the video data packets includes at least a packet header and a packet payload, wherein the packet header includes a packet ID and wherein the packet payload includes video data suitable for driving a corresponding pixel.

4. The method of claim 1, wherein the plurality of display elements comprise thin film transistors.

5. The method of claim 1, wherein the video data packets are directly received by the display unit interface without using Hsync and Vsync timing and control signals and without using a pixel clock signal.

6. A display apparatus comprising:
a display unit interface to receive packetized video data associated with a scan line for display directly from a video processing unit (VPU);
a plurality of display elements; and
a single line buffer used for storing video data to be displayed, wherein the single line buffer is configured to have a size in accordance with a scan line, wherein the display unit interface directly forwards the packetized video data to the single line buffer, filling the single line buffer within a line period T, the line period T corresponding to the scan line for display, wherein only when the single line buffer is full, the packetized video data in the single line buffer is directly passed to selected of the plurality of display elements, wherein concurrently with passing the packetized video data in the single line buffer directly to selected of the plurality of display element, directly populating the single line buffer using packetized video data received at the display unit interface, the received packetized video data associated with a next scan line for display, and wherein the display apparatus does not generate a pixel clock.

7. The display apparatus of claim 6, wherein each of the video data packets of the packetized video data includes at least a packet header and a packet payload, wherein the packet header includes a packet ID and wherein the packet payload includes video data suitable for driving a corresponding pixel.

8. The display apparatus of claim 6, wherein the plurality of display elements comprise thin film transistors.

9. A non-transitory computer-readable medium having stored thereon data representing instructions that, when performed by a processing element of a display unit having a single line buffer having a size in accordance with a scan line and a plurality of display elements, the processor performs operations comprising:
(a) receiving video data packets associated with a scan line at a display unit interface;
(b) directly populating the single line buffer using the video data packets received at the display unit interface within a line period τ, the line period τ corresponding to the scan line for display;
(c) only when the single line buffer is full, passing the video data stored in the single line buffer directly to selected of the plurality of display elements; and
(d) concurrently with passing the video data (c), directly populating the single line buffer using video data packets received at the display unit interface, the received video data packets associated with a next scan line for display.

10. The computer-readable medium of claim 9, wherein the display unit does not generate a clock signal.

11. The computer-readable medium of claim 9, wherein the plurality of display elements comprise thin film transistors.

12. An integrated circuit configured to:
receive video data packets associated with a scan line for display;
directly populate a single line buffer using the received video data packets within a line period τ, the line period τ corresponding to the scan line for display, wherein the single line buffer has a size in accordance with a scan line;

forward the video data packets stored in the single line buffer to selected display elements only when the single line buffer becomes full; and concurrently with forwarding the data packets to selected display elements, directly populate the single line buffer using received video data packets associated with a next scan line for display.

\* \* \* \* \*